Oct. 17, 1961    J. R. BRADFORD ET AL    3,005,101
SCINTILLATION-COUNTER PROBE FOR HIGH TEMPERATURE SAMPLING
Filed Oct. 31, 1957                                     2 Sheets-Sheet 1
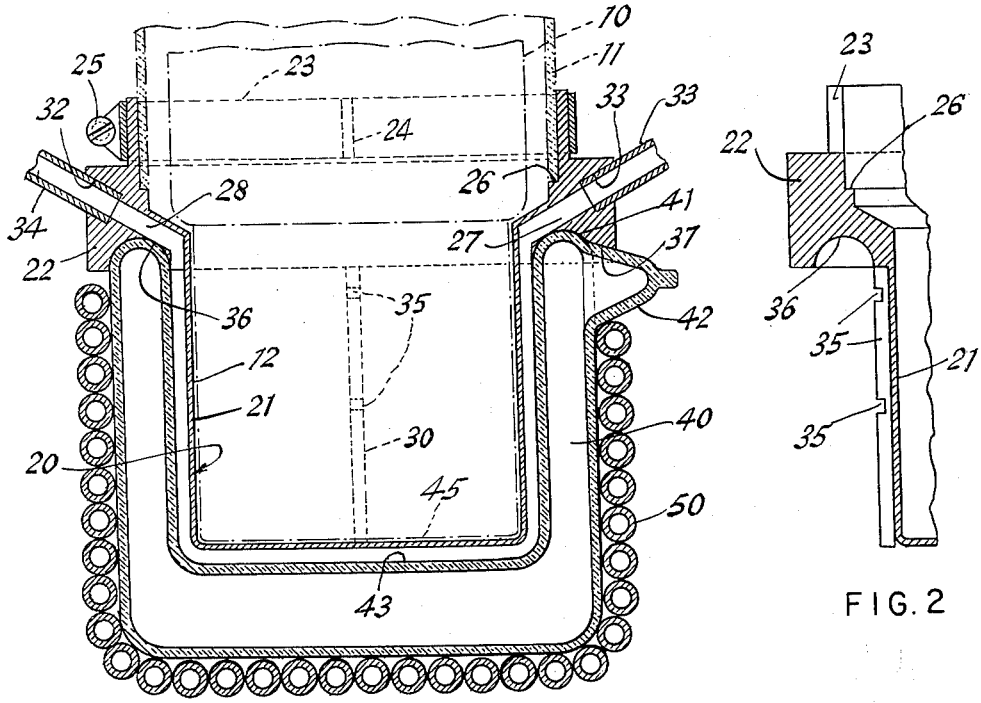
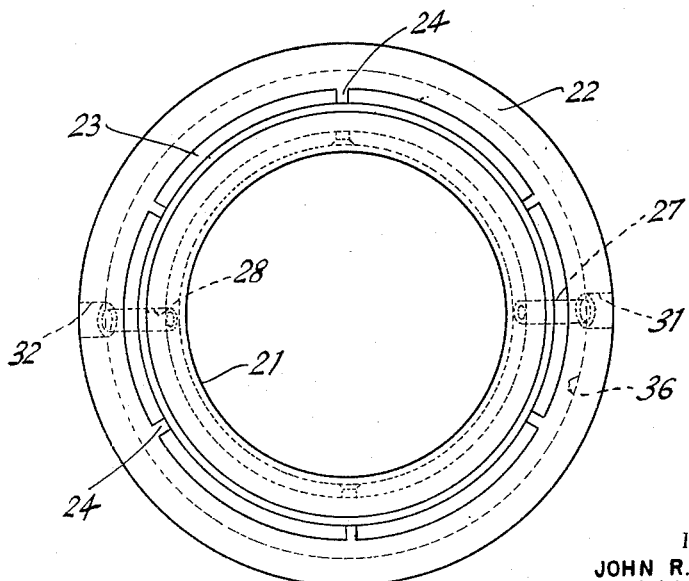
INVENTORS
JOHN R. BRADFORD
NATHAN L. DICKINSON
BY  DONALD N. FELGAR
WILLIAM T. HAGE
*JPMoran* ATTORNEY Oct. 17, 1961 J. R. BRADFORD ET AL 3,005,101
SCINTILLATION-COUNTER PROBE FOR HIGH TEMPERATURE SAMPLING
Filed Oct. 31, 1957 2 Sheets-Sheet 2

INVENTORS
JOHN R. BRADFORD
NATHAN L. DICKINSON
BY DONALD N. FELGAR
WILLIAM T. HAGE

*Moran* ATTORNEY

3,005,101
SCINTILLATION-COUNTER PROBE FOR HIGH TEMPERATURE SAMPLING

John R. Bradford, Lubbock, Tex., Nathan L. Dickinson, Westfield, N.J., Donald N. Felgar, Palos Verdes Estates, Calif., and William T. Hage, Alliance, Ohio, assignors to The Babcock & Wilcox Company, New York, N.Y., a corporation of New Jersey
Filed Oct. 31, 1957, Ser. No. 693,572
12 Claims. (Cl. 250—71.5)

This invention relates to testing apparatus and, more particularly, to a novel radiation counter particularly adapted for sensing radioactivity of fluids flowing in systems operating at high pressures and high temperatures.

Until recently, many problems were involved in investigating the behavior of contaminants in solution or suspension in fluids flowing in systems operating at pressures other than atmospheric and temperatures other than ambient. Such fluids could be tested only by withdrawing samples from the system, and the obtaining of representative samples is difficult, more particularly where there are two or more fluid phases present in the system.

Other problems are encountered due to contamination of the sample line, depositions in the sample line, change in phase of the sample relative to the phase in the system, the time lag between taking the sample and completing the analysis, and the generally undesirable change in the volume of fluid in the system due to withdrawal of the samples. In addition, such sampling procedures have required samples to be available for analysis only at atmospheric pressure and ambient temperature irrespective of pressure and temperature conditions at the source of the sample.

More recently, techniques have been developed for using radioactivity for studying the behavior of fluid systems, and these techniques have obviated many of the problems inherent in sampling techniques. More particularly, when radioactivity can be imparted to a fluid, as by utilizing radioactive constituents or tracers, therein, it is possible to study the fluid behavior in situ, since radioactivity involves the emission of rays having the property of being able to pass through certain materials, such as the containing walls of a fluid system. The radioactivity can then be detected externally of the system by using appropriate sensing devices.

While radioactive techniques have greatly simplified and improved the investigation of fluid systems operating at other than atmospheric pressure and ambient temperature, such techniques are nevertheless subject to certain fundamental limitations which restrict their application to relatively narrow ranges to temperature and pressure. For example, known sensing devices for radioactivity are not only temperature sensitive but also have a maximum operating temperature of the order of 100° F. These devices furthermore cannot be subject to any appreciable pressure. Another disadvantage is that any increase in distance or mass between the fluid and the sensing device, as for protection against temperature and pressure effects, decreases the quantity of radioactive emission reaching the sensing device.

In accordance with the present invention, it has been found that radioactivity sensing devices may be efficiently used for sensing radioactivity in system fluids flowing under system conditions of elevated pressure, without disturbing the quantity of fluid in the system by closely surrounding the radioactivity sensing element by a coil of high pressure tubing, preferably of small diameter, connected at each end into the system for flow of the system fluid therein under the system pressure conditions. The high pressure tubing protects the sensing elements from pressure effects and is disposed so close to the sensing element that there is substantially no losses in the transmission of radioactivity from the fluid to the sensing element.

Protection of the sensing element from the effects of temperatures in excess of the maximum operating temperature of the sensing element may be afforded by encasing the sensing element in a cup-shaped housing of light-weight metal, disposing this housing in sealed relation in a "Dewar" or vacuum cup in such manner that coolant may be circulated between the outer surface of the casing or housing and the inner wall of the vacuum cup, and wrapping high pressure tubing helically around, and over the end of, the outer wall of the cup for circulation of the system fluid through such tubing at the system pressure and temperature. The coolant flow is so selected that the ambient temperature in the cup-shaped housing is below the maximum operating temperature of the sensing element. By this arrangement, the sensing means is fully insulated from pressure and temperature effects while still being situated at a minimum distance from the system fluid flowing under system conditions.

For an understanding of the invention principles, reference is made to the following description of a typical embodiment thereof as illustrated in the accompanying drawing. In the drawing:

FIG. 1 is a partial axial sectional view of part of the invention arrangement;

FIG. 2 is a fragmentary sectional view at right angles to that of FIG. 1;

FIG. 3 is a plan view of an aluminum cup forming part of the arrangement; and

Figure 4:
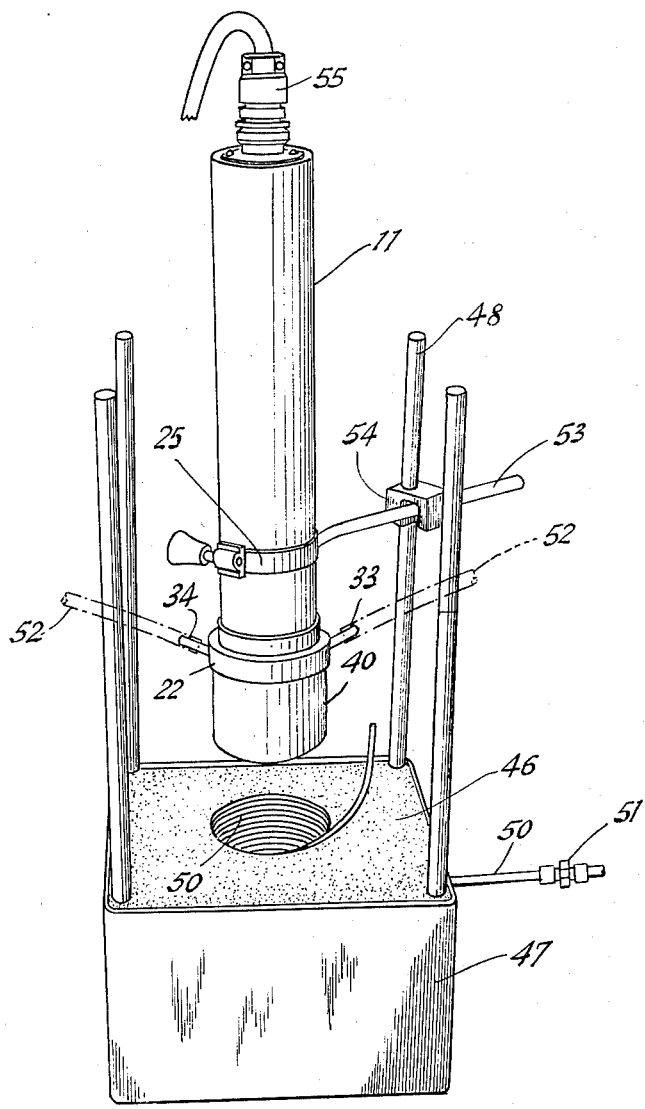
FIG. 4 is a perspective view of an operative embodiment of the invention just before being placed in operation.

In the particular embodiment of the invention selected for illustration in the drawings, a scintillation crystal 45 arranged in operative association with a photomultiplier tube 10 is substantially enclosed within a generally cup-shaped member 20, of aluminum or other light-weight metal, disposed within a cup-shaped "Dewar" or vacuum flask 40. A space is left between the outer surface of member 20 and the inner surface of flask 40 to form a chamber for the circulation of coolant. The system fluid, under system conditions of temperature and pressure, is brought into radioactivity transfer relation with crystal 45 by circulation through a coil of small diameter high pressure tubing 50 surrounding vacuum flask 40. Coil 50 is constructed and arranged for direct connection in the system.

The coolant circulated through the coolant chamber, in cooperation with the vacuum flask, maintains the temperature within member 20 at a value below the maximum operating temperature of crystal 45. The coil of small diameter, high pressure tubing 50 brings the system fluid into close and effective association with crystal 45 without the crystal being subjected to the system pressure. The light mass of member 20, together with the vacuum of flask 40, provide for efficient passage of radioactivity from the fluid to the crystal without any appreciable absorption of the radioactive rays.

The crystal 45 preferably is disposed in a metal jacket 12 which has a clearance fit within member 20. Member 20 may be fabricated, by way of example only, by boring and machining a cylindrical aluminum bar to form a cup 21 having a relatively heavy flange 22 at its open upper end. Flange 22 has a relatively thin upper extension 23 which has uniformly spaced slits 24 cut therein. Flange 22 and its extension 23 are bored to form a relatively deep seating recess 26 for shield 11. Member 20 is clamped onto the shield 11 by suitable means such as a worm-drive hose clamp 25 embracing the slitted flange 23.

Flange 22 has a coolant inlet passage 27 and a coolant outlet passage 28 drilled therethrough and counterbored as at 31 and 32 to receiving tubing sections 33, 34 over which flexible tubing may be drawn. A pair of aluminum bars 30 are welded or brazed along the side wall of cup 21 in alignment with the coolant inlet and outlet passages, bars 30 having notches 35 therein. The bars 30 divide the coolant stream to assure uniform flow over the surface of cup 21, and have a depth substantially equal to the diameter of the inner ends of passages 27 and 28.

The lower surface of flange 22 has an annular groove 36 of semi-circular cross-section formed therein, the inner side of groove 36 being substantially tangent to the inner ends of passages 27 and 28. Groove 36 conformingly receives the mating upper edge or rim 41 of the "Dewar" or vacuum flask 40. At one point of its periphery, the underside of flange 22 has a radial recess 37 which conformingly receives the evacuating nipple 42 of flask 40. The upper edge of the flask 40 is cemented in water-tight relation in recess 36. The dimensions of flask 40 are such that its inner surface 43 is uniformly spaced from the outer surface of member 20 by the radial width of bars 30.

With the arrangement thus far described, the temperature within member 20 is maintained at a value below the maximum operating temperature of crystal 45 by virtue of coolant supplied through inlet tube 33 and circulating between the outer surface of cup 21 and the inner surface of flask 40, and by the vacuum barrier provided by flask 40. At the same time, the distance between the outer surface of flask 40 and the interior of cup 21 is kept at a minimum.

Scintillating crystal 45, encased in metal housing 12, is mounted in operative relation axially of the photomultiplier tube 10 disposed in opaque tubular shield 11. When crystal 45 is subjected to radioactivity, it scintillates and the scintillations excite tube 10. The intensity of excitation is dependent upon the intensity of the radioactivity.

In accordance with the invention, the radioactivated system fluid is brought into operative relation with crystal 45 by means of the small diameter high pressure tubing 50 which is helically coiled around the side wall of flask 40 and spirally coiled over the base or end wall thereof so that flask 40 fits closely within a cup-shape coil of tubing 50.

Tubing 50 is arranged as an outwardly spirally flat section adjacent the end wall of flask 40 and continuous with a helical section surrounding the side wall of the flask. Tubing 50 has inlet and outlet ends, one of which is substantially at the center of the flat section and the other of which is at the remote end of the helical section. By virtue of these inlet and outlet ends, tubing 50 is connected continuously and directly in the fluid system, which system may be operating at elevated pressures and temperatures, such as 1150° F. at 5000 p.s.i.g.

Under such conditions, and with the system fluid containing minute amounts of radioactive iron, the shielding afforded by the fluid cooled combination of cup 20 and flask 40 enables the temperature of crystal 45 to be maintained below 100° F. Under these conditions, and after calibration of the sensing device with standard radioactive iron solutions, the system has been found capable of detecting radioactive iron concentrations of the order of 0.001 p.p.m.

In one practical embodiment of the apparatus, the coil of tubing 50 is set in a central recess in heat insulation material 46 placed in a container 47 having upwardly extending posts 48. Couplings, such as 51, connect the inlet and outlet ends of tubing 50 to the system, and flexible tubes 52 are slipped over nipples 33, 34 for flow of coolant in the coolant chamber. The flask 40 is set into coil 50, with the other elements attached to the flask, and the device is held upright by an arm 53 connected to clamp 25 and secured in a clamp 54 adjustable along a post 48. Electrical connections to tube 10 are made by a connector 55, these connections leading to suitable power supply means and metering means.

While a specific embodiment of the invention has been shown and described in detail to illustrate the application of the invention principles, it will be understood that the invention may be embodied otherwise without departing from such principles.

What is claimed is:

1. Testing apparatus for sensing radioactive tracer elements in a system fluid subjected to elevated pressures, said apparatus comprising, in combination, a radioactivity sensing element; a cup-shape light metal enclosure for said element; and a cup-shape coil of high pressure tubing surrounding the outer surface of said enclosure and constructed and arranged for connection into the system for circulation of system fluid under system conditions through said coil.

2. Testing apparatus as claimed in claim 1 in which said coil comprises relatively small diameter tubing.

3. Testing apparatus as claimed in claim 1 in which enclosure is substantially cylindrical and has a substantially flat end wall and said coil includes an outwardly spiralling substantially flat section adjacent an end wall of said enclosure and continuous with a helical section surrounding the side wall of said enclosure, the coil having inlet and outlet connections at the center of the spiral section and the remote end of the helical section respectively.

4. Testing apparatus for sensing radioactivity in a system fluid subjected to elevated pressures at elevated temperatures, said apparatus comprising, in combination, a radioactivity sensing element; a cup-shape light metal enclosure for element disposed within a cup-shape vacuum vessel, the inner surface of said vessel being spaced from the outer surface of said enclosure to provide a cup-shape coolant chamber; means for circulating a coolant through said chamber; and a coil of high pressure tubing surrounding said vessel and constructed and arranged for connection into the system for circulation of system fluid under system conditions through said coil; said vacuum vessel and coolant circulated through said chamber maintaining the ambient temperature within said enclosure at a value below the maximum operating temperature of said element.

5. Testing apparatus for sensing radioactivity in a system fluid subjected to elevated pressures, said apparatus comprising, in combination, a radioactivity sensing element; a cup-shaped light metal enclosure for said element disposed within a cup-shape vacuum vessel; and a cup-shape coil of high pressure tubing surrounding said vessel and constructed and arranged for connection into the system for circulation of system fluid under system conditions through said coil; said vacuum vessel maintaining the ambient temperature within said enclosure at a value below the maximum operating temperature of said element.

6. Testing apparatus for sensing radioactivity in a system fluid subjected to elevated pressures at elevated temperatures, said apparatus comprising, in combination, a radioactivity sensing element; a cup-shape light metal enclosure for said element disposed within a cup-shape vacuum vessel, the inner surface of said vessel being spaced from the outer surface of said enclosure to provide a coolant chamber; means for circulating a coolant through said chamber; and a cup-shape coil of high pressure tubing surrounding said vessel and constructed and arranged for connection into the system for circulation of system fluid under system conditions through said coil; said vacuum vessel and coolant circulated through said chamber maintaining the ambient temperature within said enclosure at a value below the maximum operating temperature of said element.

7. Testing apparatus for sensing radioactivity in a system fluid subjected to elevated pressures at elevated temperatures, said apparatus comprising, in combination, a radioactivity sensing element; a cup-shape light metal enclosure for said element having a substantially flat end wall and disposed within a cup-shape vacuum vessel, the inner surface of said vessel being spaced from the outer surface of said enclosure to provide a coolant chamber; means for circulating a coolant through said chamber; and a coil of high pressure tubing including an outwardly spiralling substantially flat section adjacent an end wall of said vessel and continuous with a helical section surrounding the side wall of said vessel, the coil having inlet and outlet connections respectively at the center of the spiral section and the remote end of the helical section for connection of the coil into the system for circulation of system fluid under system conditions through said coil; said vacuum vessel and coolant circulated through said chamber substantially isolating said element from the elevated pressures and elevated temperatures of the system fluid.

8. Apparatus as claimed in claim 7 in which said enclosure has an outwardly projecting flange adjacent an open end having a recess conformingly receiving the rim of said vacuum vessel; and a water-tight seal between said flange and said rim.

9. Apparatus as claimed in claim 8 in which said enclosure has a pair of ribs extending longitudinally of its outer side surface at diametrically opposite points and engaging the inner side surface of said vessel; said ribs having slots in their outer edges for flow of coolant circumferentially of said chamber.

10. Apparatus as claimed in claim 7 in which said element comprises a scintillating crystal; a photoelectric tube disposed adjacent said crystal for activation by the latter; an opaque shield surrounding said tube; and releasable clamping means securing the upper end of said enclosure in embracing relation to the end of said shield.

11. Testing apparatus for sensing radioactive tracer elements in a system fluid subjected to elevated pressures, said apparatus comprising, in combination, a radioactivity sensing element; a cup-shape light metal enclosure for said element; and wall means forming a high pressure flow passageway surrounding the outer surface of said enclosure and constructed and arranged for connection into the system for circulating a system fluid under system conditions through said flow passageway.

12. Testing apparatus for sensing radioactivity in a system fluid subjected to elevated temperatures, said apparatus comprising, in combination, a radioactivity sensing element; a cup-shaped light metal enclosure for said element disposed within a cup-shape vacuum vessel the inner surface of said vessel being spaced from the outer surface of said enclosure to provide a coolant chamber; means for circulating a coolant through said chamber, and wall means forming a flow passageway surrounding said vessel and constructed and arranged for connection into the system for circulation of system fluid under system conditions through said coil; said vacuum vessel and coolant circulated through said chamber maintaining the ambient temperature within said enclosure at a value below the maximum operating temperature of said element.

References Cited in the file of this patent

UNITED STATES PATENTS

| | | |
|---|---|---|
| 2,711,084 | Bergan | June 21, 1955 |
| 2,713,124 | Graham | July 12, 1955 |
| 2,714,169 | Armistead | July 26, 1955 |
| 2,738,426 | Hurst | Mar. 13, 1956 |
| 2,782,318 | Herzog | Feb. 19, 1957 |
| 2,824,233 | Herzog | Feb. 18, 1958 |
| 2,862,106 | Scherbatskoy | Nov. 25, 1958 |

OTHER REFERENCES

Sear: "A Method for Presenting Liquid Samples to the Flat Surface of a Scintillation Crystal," Nucleonics, vol. 11, No. 4, pages 52–53, April 1953.